(12) United States Patent
Davis

(10) Patent No.: US 12,477,965 B2
(45) Date of Patent: Nov. 25, 2025

(54) WEEDING DEVICE

(71) Applicant: Jeffrey T. Davis, Crown Point, IN (US)

(72) Inventor: Jeffrey T. Davis, Crown Point, IN (US)

( * ) Notice: Subject to any disclaimer, the term of this patent is extended or adjusted under 35 U.S.C. 154(b) by 803 days.

(21) Appl. No.: 17/734,405

(22) Filed: May 2, 2022

(65) Prior Publication Data

US 2022/0346298 A1 Nov. 3, 2022

Related U.S. Application Data

(60) Provisional application No. 63/182,234, filed on Apr. 30, 2021.

(51) Int. Cl.
*A01B 1/16* (2006.01)
*A01M 21/04* (2006.01)

(52) U.S. Cl.
CPC ............. *A01B 1/16* (2013.01); *A01M 21/043* (2013.01)

(58) Field of Classification Search
CPC .. A01B 1/16; A01B 1/20; A01B 39/08; A01B 39/085; A01B 39/18; A01M 21/00; A01M 21/043; A01C 23/008; A01C 23/02; A01C 23/023
USPC ...................................... 171/50, 26, 27, 137
See application file for complete search history.

(56) References Cited

U.S. PATENT DOCUMENTS

| | | |
|---|---|---|
| 708,126 A | 9/1902 | Chase |
| 773,743 A | 11/1904 | Hoffmann |
| 4,466,490 A | 8/1984 | Eckels |
| 6,128,850 A | 10/2000 | Duffy |
| 6,257,346 B1 | 7/2001 | Schofield et al. |
| 6,497,088 B1* | 12/2002 | Holley ............... A01D 43/14 56/16.8 |
| 6,634,435 B2 | 10/2003 | Saeger |
| 7,465,392 B1* | 12/2008 | Wang .................. A01D 44/00 241/46.11 |
| 7,739,800 B2* | 6/2010 | Hurley ................ A01D 34/905 172/14 |
| 9,541,076 B1* | 1/2017 | Weiss ................. A01M 21/043 |
| 2013/0149021 A1* | 6/2013 | Kast ................... A01M 21/043 222/282 |
| 2014/0096443 A1* | 4/2014 | Hobbs ................. A01M 21/043 47/1.5 |

* cited by examiner

*Primary Examiner* — Christopher J Sebesta
*Assistant Examiner* — Evan A Bregel
(74) *Attorney, Agent, or Firm* — Bold IP, PLLC; Houda El-Jarrah

(57) ABSTRACT

A weeding device provides a solution to the problem of removing dandelions and other weeds from a lawn or other area. The core components of the invention are a shaft and handle arranged so that a user can remove weeds while standing, a cutting head and motor configured to cut weeds, and an herbicide injector configured to inject an herbicide into the weed. Generally speaking, the components are configured as follows: the handle is at one end of the shaft and the motor, cutting head, and herbicide injector are at a second end of the shaft. The cutting head is configured to rotate around the herbicide injector to cut portions of the weed while herbicide is injected into the weed by the herbicide injector.

12 Claims, 4 Drawing Sheets

WEEDING DEVICE

CROSS-REFERENCE TO RELATED APPLICATION

This application claims priority to U.S. Provisional Application No. 63/182,234 filed on Apr. 30, 2021.

FIELD OF THE INVENTION

The present invention is a weeding device, which provides a solution to the problem of removing dandelions and other weeds from a lawn or other area. The core components of the invention are a shaft and handle arranged so that a user can remove weeds while standing, a cutting head and motor configured to cut weeds, and an herbicide injector configured to inject an herbicide into the weed. Generally speaking, the components are configured as follows: the handle is at one end of the shaft and the motor, cutting head, and herbicide injector are at a second end of the shaft. The cutting head is configured to rotate around the herbicide injector to cut portions of the weed while herbicide is injected into the weed by the herbicide injector.

BACKGROUND

Weeding, the removal of unwanted plants, has been performed since agriculture was invented. When weeds are intermixed with the desired plants, targeted measures are required to remove only the unwanted plants and not damage the desired plants.

For a lawn or other form of cultivated land where the desired plants cover almost the entirety of the land, these targeted measures must be very precise so as not to destroy the desired plants. For this reason, handheld weeding devices are often short and users of handheld weeding devices are often required to kneel while digging out weeds. This is taxing on the body of the user and time consuming.

Although some weeding devices that can be used while standing exist, the devices are often imprecise and are not suitable for use on a lawn because the device would cause considerable damage to the lawn while removing the weeds.

SUMMARY

The disclosed device is unique when compared with other known devices and solutions because it provides a device that cuts and applies herbicide to weeds and allows a user to remain standing while weeding.

The disclosed device is unique in that it is structurally different from other known devices or solutions. More specifically, the device is unique due to the presence of: (1) a rotating cutting head that rotates around an herbicide injector and cuts weeds while not significantly damaging grass; (2) a shaft long enough for a user to use while standing and cutting head and an herbicide injector.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

Figure 1:
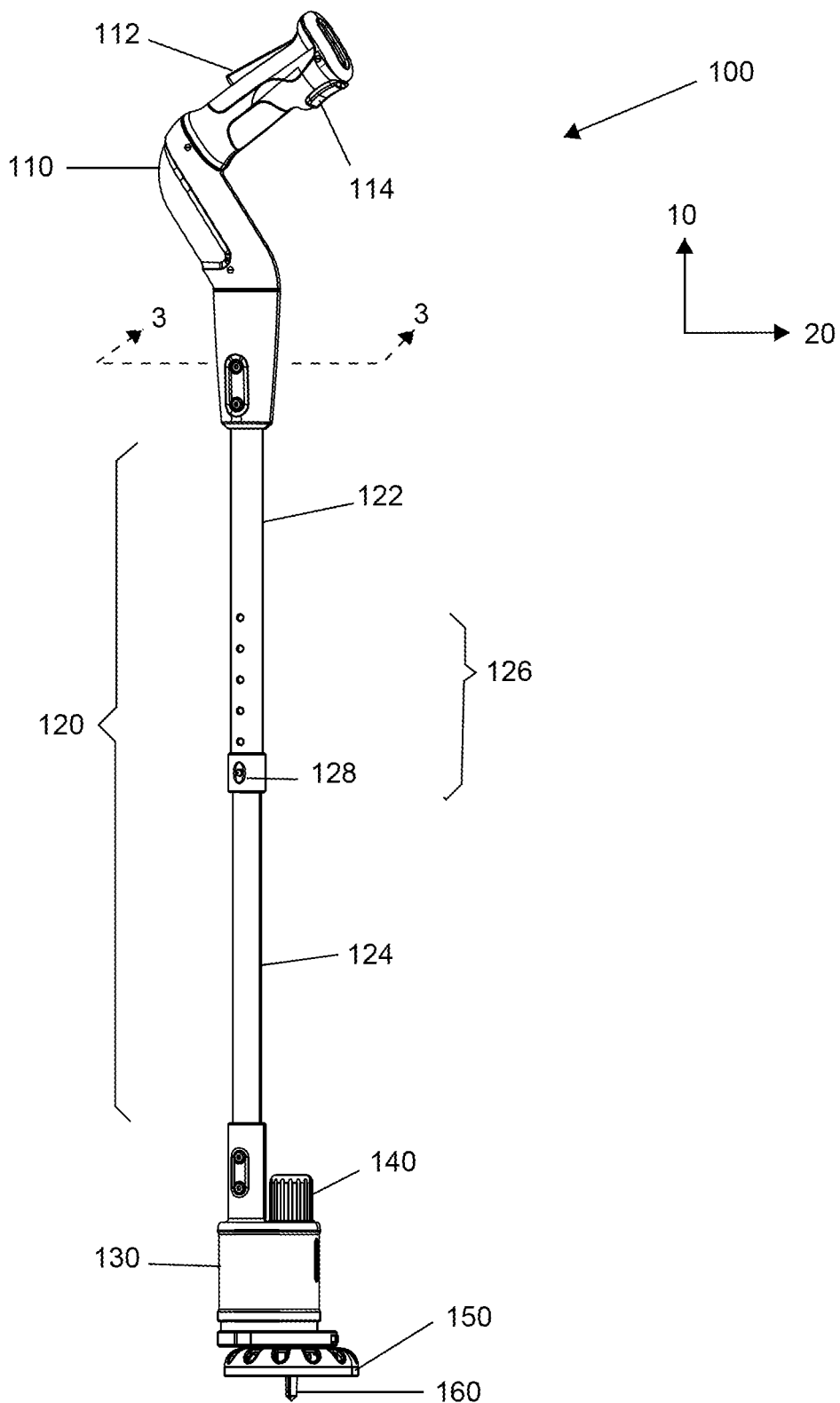
FIG. 1 shows an example side view of a weeding device.

FIG. 1 shows an example side view of a weeding device 100. The weeding device may include a handle 110 with a first button 112 and a second button 114, an adjustable shaft 120 with a first section 122 and a second section 124, a casing 130, an herbicide container 140, a guard 150, an herbicide injector 160, and a cutting head 170 (shown in FIG. 2). The handle 110 may be connected to a first end of the shaft 120 (on the first section 122). The handle 110 may be sized for an adult human hand (e.g., about 1.5 inches in diameter).

Unless otherwise specified, throughout this application, "vertical" means along the direction of the elongation of the handle 110 as illustrated by an arrow 10 in FIG. 1; "top" means a portion or direction along the vertical direction toward the handle 110; "bottom" means a portion or direction opposite the top along the vertical direction toward the herbicide injector 160; "front" or "forward" direction means the direction in which the handle 110 is angled from the vertical direction as illustrated by an arrow 20 in FIG. 1; "side" direction means the direction perpendicular to the vertical and front directions and perpendicular to the surface of FIG. 1; and "horizontal" means any direction perpendicular to the vertical direction, which includes the front and side directions.

The handle 110 may have various shapes such as straight up (from the perspective of FIG. 1), curved forward (as shown in FIG. 1), horizontal, etc. As will be described in greater detail below, the first button 112 and the second button 114 may be electrically connected such that pressing both the first button and the second button will cause the motor 180 (not shown in this figure) to rotate the cutting head 170. The first button 112 and the second button 114 may be arranged on opposite sides of the handle 110 to prevent accidental activation of the cutting head by both buttons being accidentally pressed at the same time.

The shaft 120 may be adjustable in length. For example, the first section 122 may include holes 126 and the second section 124 may include a spring-loaded plug 128 that is sized to enter into one of the holes in the first section to select a length of the shaft 120.

A casing 130 may be attached to a second end of the shaft (on the second section 124). As will be described in greater detail below, the casing 130 is connected to the herbicide container 140, guard 150, herbicide injector 160, and cutting head 170, and the casing 130 partially or entirely encloses various components including motor 180 (shown in FIGS. 3-4).

The herbicide container 140 may be a hollow container capable of containing herbicide useful for killing weeds. The herbicide container 140 may be screwed into or otherwise secured to the casing 130.

Figure 2:
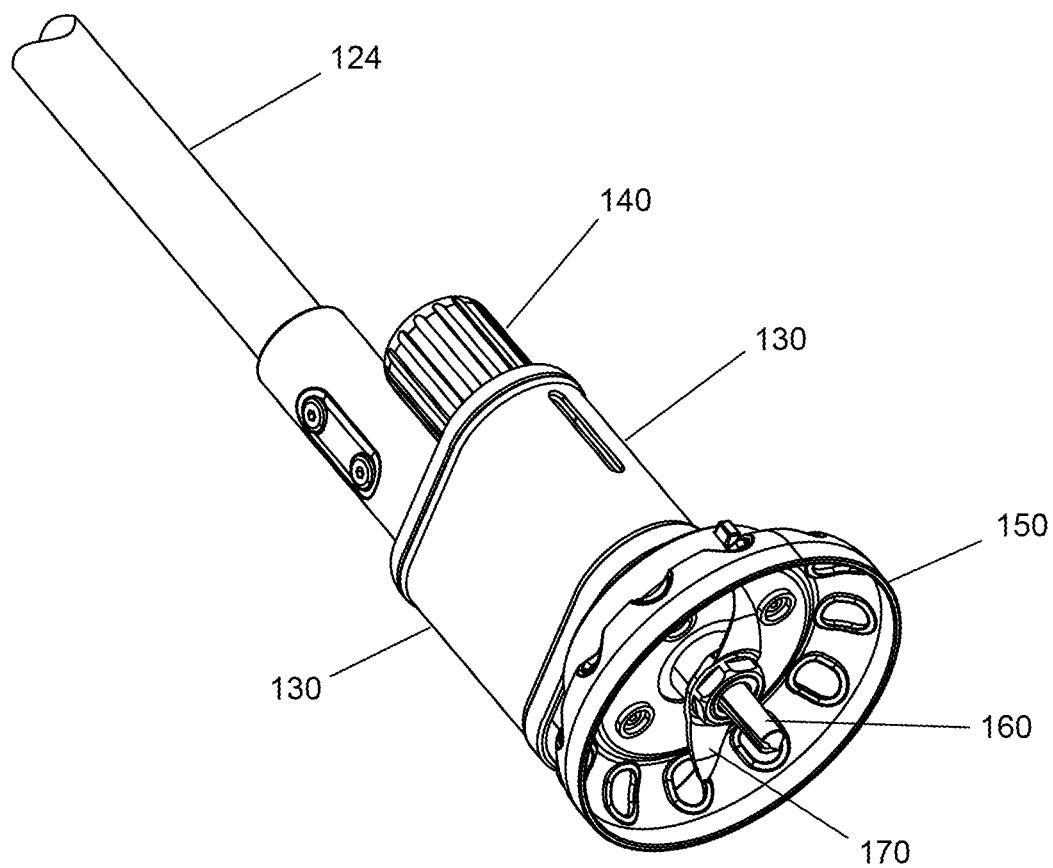
FIG. 2 shows a partial perspective view of the weeding device of FIG. 1.

The guard 150 may be fixed to the bottom of the casing 130. The guard may surround a top portion of the cutting head 170 to prevent a user from being injured by contacting the cutting head 170 with their foot or other parts of the body, or to prevent damaging with the cutting head 170 unwanted objects such as a fence or other objects when the weeding device is moved about horizontally. In non-limiting embodiments, as shown in FIG. 2, the guard 150 may have a disc shape that is curved toward the bottom at its outer rim to cover the cutting head 170. For additional user protection, the guard 150 may be made transparent or translucent so that the user may see the movement of the cutting head 170.

The herbicide injector 160 may be a spike or other protrusion from the bottom of the casing 130. The herbicide injector 160 may be hollow and herbicide may be injected through the hollow of the herbicide injector 160. For a non-limiting example, herbicide container 140 containing liquid herbicide may be fluidly connected to the herbicide injector 160 via a tube or hose (not shown). The flow of herbicide from the herbicide container 140 through the tube down to the herbicide injector 160 may be controlled by an optional herbicide injector button (not shown). In this case, when a user presses the herbicide injector button, the liquid flow path opens up, and the liquid herbicide drops from the herbicide injector 160 by gravity. Alternatively, the herbicide container 140 may be omitted and the herbicide injector 160 may be coated in herbicide and the herbicide may be injected into a weed by a user inserting the herbicide injector into the weed. In non-limiting embodiments, additional mechanism may be implemented whereby the herbicide injector 160 protrudes further downward from its retracted position such that the herbicide injector penetrates more deeply in the dirt. Any other alternatives known to a person having ordinary skill in the art may be implemented as the mechanism of injecting herbicide.

The cutting head 170 may also protrude from the bottom of the casing 130 and be configured to rotate with the herbicide injector 160 as the axis of rotation. For a non-limiting example, the cutting head 170 may comprise two or more blades that are angularly distributed around the axis of rotation. The exemplary cutting head 170 shown in FIG. 2 comprises two metal blades. Alternatively, the cutting head 170 may comprise two or more string trimmer lines (not shown). In these embodiments, each string trimmer line has its one end connected to a rotor of the cutting head 170 and the other end hangs loose, such that when the rotor rotates the string trimmer lines axially spread and cut weeds. Any other alternatives using a rotating cutting head known to a person having ordinary skill in the art may be implemented.

In some embodiments, the herbicide injector 160 may rotate with the cutting head 170. In other embodiments, the herbicide injector 160 may be kept stationary while the cutting head 170 is rotated. In some embodiments, the cutting head 170 may be integrated into the structure of the herbicide injector 160, and in other embodiments, the cutting head 170 may be made separate from the herbicide injector 160. In some embodiments, the guard 150 may have a diameter of about 3 inches, the cutting head 170 may be less than 3 inches in width, and the herbicide injector 160 may be about 1 inch in diameter. Advantageously, the concentric configuration of the herbicide injector 160 and the cutting head 170 rotating around the herbicide injector 160 enables a user to cut weeds and apply herbicide at the same time without changing posture or devices.

Figure 3:
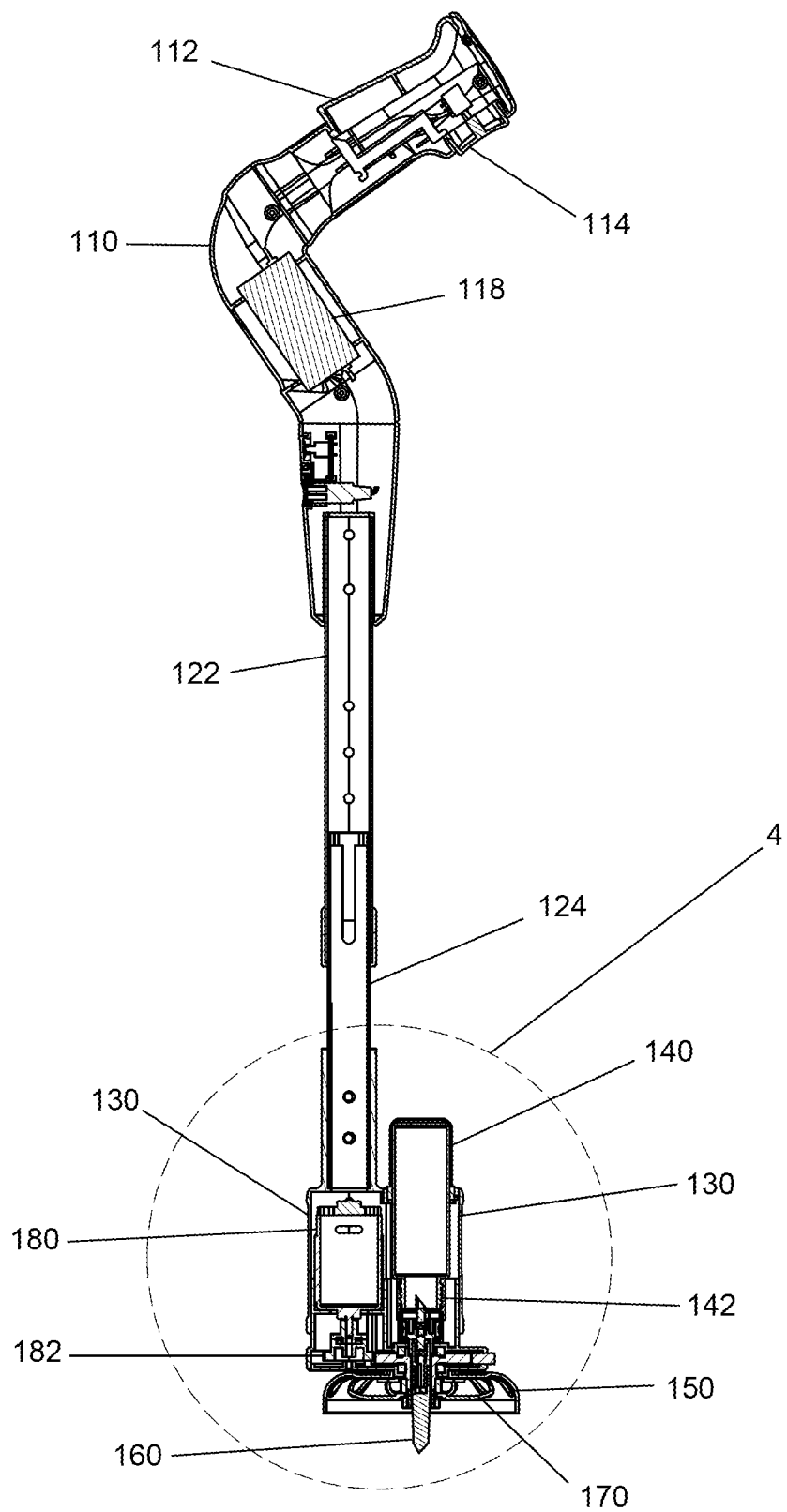
FIG. 3 shows a side sectional view of the weeding device of FIG. 1.

As shown in FIGS. 1 and 3, in some embodiments, the casing 130, the guard 150, the herbicide injector 160, and the cutting head 170 may be aligned along the elongated direction of the shaft 120, such that the axis of rotation of the cutting head 170 is parallel to the elongated direction of the shaft 120. Alternatively, in other embodiments, the casing 130, the guard 150, the herbicide injector 160, and the cutting head 170 may be angled from the shaft 120, such that when a user holds the handle 110 and stretches the shaft 120 in front of the user by tilting the shaft 120 forward, the axis of rotation of the cutting head 170 is perpendicular to the ground. For example, the casing 130, the guard 150, the herbicide injector 160, and the cutting head 170 may be angled by about 15 degrees with respect to the elongated direction of the shaft 120. This configuration may allow the user to more comfortably hold the weeding device 100 while operating the cutting head 170 and the herbicide injector 160.

The guard 150 may include metal, plastic, or another durable material. As mentioned above, the guard 150 may be made transparent or translucent so that the user may see the movement of the cutting head 170. The casing 130 may include metal, plastic, or other durable materials. The cutting head 170 may include metal or other durable materials that are suitable for cutting weeds. In embodiments where the cutting head 170 comprises string trimmer lines connected to a rotor, the string trimmer lines may be made out of flexible plastic or metal. The herbicide injector 160 may include metal or other durable materials suitable for being inserted into weeds and dirt. The herbicide container 140 may include plastic, metal, or other durable material suitable for holding herbicide. The shaft 120 may include metal or another durable material suitable to withstand the forces of pressing the herbicide injector 160 into weeds and dirt. The handle 110 may similarly include plastic, metal, or other material suitable to withstand the forces of pressing the herbicide injector 160 into weeds and dirt.

FIG. 2 shows a partial perspective view of the weeding device 100, showing the bottom portion of the cutting head 170 and the guard 150. The handle 110 and a portion of the shaft 120 are not shown to allow for greater details to be shown in the viewed portion of the weeding device 100. The cutting head 170 may include two or more blades, each with a substantially horizontal cutting edge. The top side of the cutting head 170 is entirely surrounded by the guard 150 for purposes of user protection. In addition, as mentioned above, the guard 150 may have a disc shape that is curved toward the bottom at its outer rim, or a shape similar to an umbrella, in order to cover the cutting head 170. The guard 150 in this shape may prevent the horizontal cutting edge of the blade from digging into the ground because the bottom of the guard 150 is lower than the bottom of the cutting head 170. Thus, any grass that is cut by the cutting head will only be cut short (which does not significantly damage the grass) and the roots of the grass will not be damaged while the stalk and leaves of weeds such as dandelions are cut by the cutting head 170 while herbicide may also be injected into the base of the stalk or the roots of the weed via the herbicide injector 160. The herbicide injector 160 may extend below the guard 150.

FIG. 3 shows a side sectional view of the weeding device 100 of FIG. 1 taken at the sectioning plane and in the direction indicated by section lines 3-3 in FIG. 1, which symmetrically divides the weeding device 100. The handle 110 may include a power supply 118, such as a battery. The power supply 118 may be electrically connected to the first button 112, the second button 114, and the motor 180 such that when the first button 112 and the second button 114 are pressed the power supply supplies power to the motor 180. The motor 180 may be an electric motor. However, any other source of energy for the motor 180 well known for a person having ordinary skill in the art may be possible. For example, a gasoline-powered motor 180 may be implemented. The motor 180 may be in the casing 130 and connected to a drive hardware 182. The drive hardware 182 may be mechanically connected to the cutting head 170 and configured to transfer the rotational motion of the motor 180 to the cutting head 170. In some non-limiting embodiments, the drive hardware 182 may include a set of gears. In other embodiments, the drive hardware 182 may include two pulleys and a belt (not shown). Thus, the cutting head 170 may be rotated by the belt when the motor 180 moves the drive hardware 182 when electric power is supplied to the motor 180 from the battery 118 when the first button 112 and the second button 114 are pressed at the same time.

The herbicide container 140 may be connected to the herbicide injector 160 by a tube or hose 142. Herbicide may flow through the tube 142 from the herbicide container 140 to the herbicide injector 160. As mentioned above, the flow of herbicide from the herbicide container 140 through the tube 142 down to the herbicide injector 160 may be controlled by an optional herbicide releaser button (not shown) connected to a tube pincher 162 (shown in detail in FIG. 4) that may also be battery-operated to open and close the fluidic path from the herbicide container 140 to the herbicide injector 170.

Figure 4:
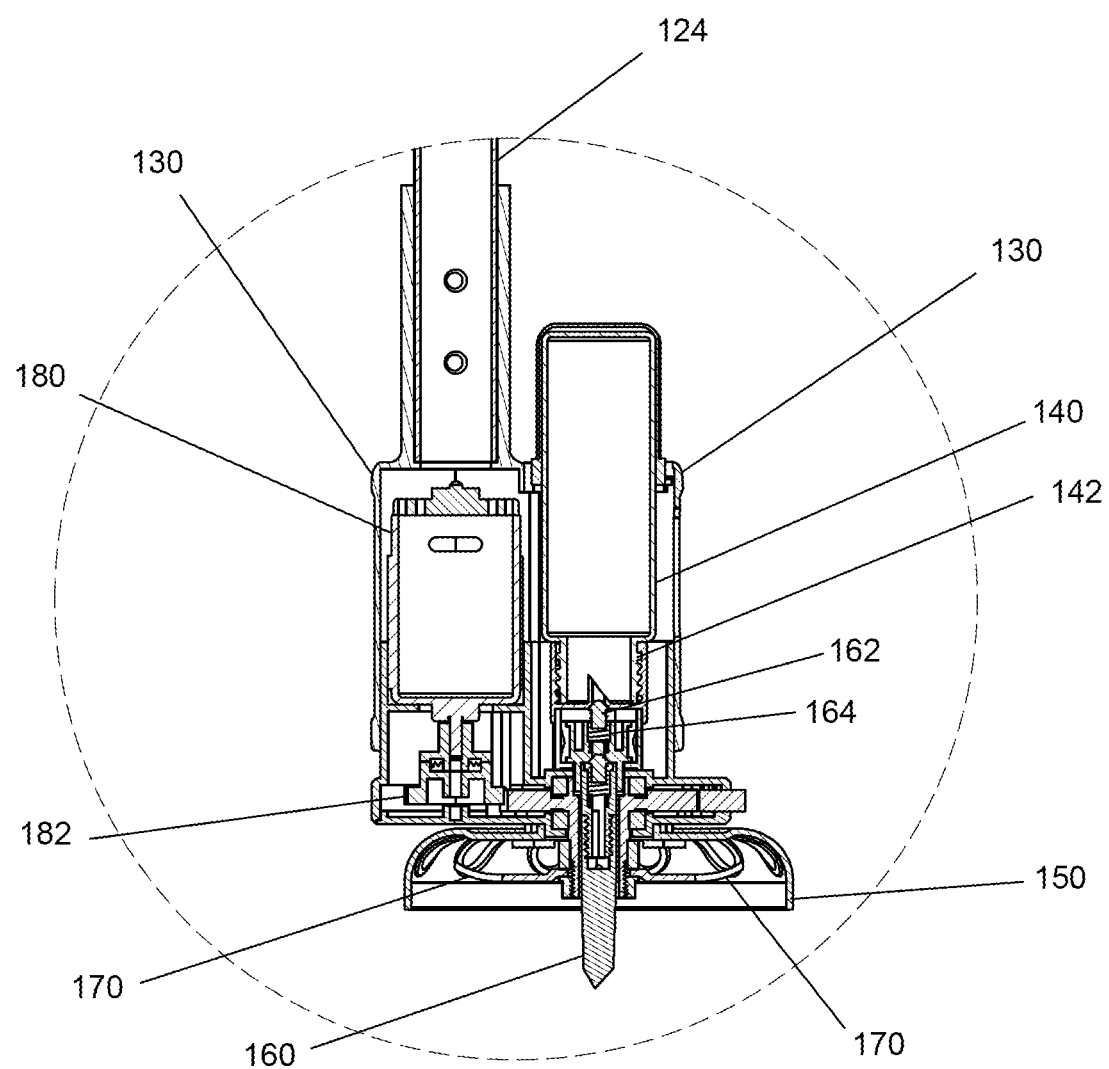
FIG. 4 shows a partial side sectional view of the weeding device of FIG. 3.

FIG. 4 shows a partial side sectional view of a portion of the weeding device 100 showing an enlarged view inside the dashed circle of FIG. 3. In this embodiment, the herbicide injector 160 may be able to move vertically relative to the casing 130. The device 100 may include a tube pincher 162 attached to the herbicide injector 160 and a spring 164 attached between the tube pincher 162 and a portion of the casing 130 (such as a portion of the casing 130 securing the herbicide container 140). The tube pincher 162 may also be electrically connected to an herbicide releaser button (not shown). The spring 164 may press the tube pincher 162 down on the tube 142 pinching off flow of herbicide to the herbicide injector 160. Alternatively, any other mechanism known to a person having ordinary skill in the art may be used to implement releasing and stopping the herbicide.

For example, when the herbicide injector 160 is pressed against an object such as the dirt, the herbicide injector 160 may be configured to be pushed up, such that the herbicide injector 160 may push the tube pincher 162 up and allow the flow of the herbicide through the tube 142 from the herbicide container 140 to the herbicide injector 160. Thus, a user of the weeding device 100 may inject herbicide into a weed by pressing the herbicide injector 160 against the weed hard enough to cause the tube pincher 164 to stop pinching the tube 142 and allow flow of herbicide to the herbicide injector 160 by gravity.

Alternatively, the weeding device 100 may include an actuator (not shown) that pumps herbicide from the herbicide container 140 to the herbicide injector 160. As an additional alternative, the weeding device may not include an herbicide container and herbicide may be applied directly to the herbicide injector 160 by a user.

The tube 142 may include a flexible plastic or silicone tube or other tubing suitable for having flow pinched off and have flow return when the pinching pressure is relieved. The tube pincher 162 may include metal, plastic, or other rigid durable material. The spring 164 may include a metal spring, an elastic material, or other material with a restoring force that can be utilized to apply a force to the tube pincher 162.

In some non-limiting embodiments, the cutting head 170 may also include one or more shaped wires (not shown) that extends below the guard 150. The shaped wires may be shaped to project substantially vertically below the guard 150, for example, about ½ inch below the guard within about 30 degrees from the vertical direction. Grass which is used in lawns tends to extend mainly vertically from the ground while weeds such as dandelions and crabgrass tend to extend more horizontally above the ground. Accordingly, a cutting head that includes shaped wires that extend substantially vertically below the guard will damage lawn grass much less than it damages weeds when it spins in a horizontal circle.

Advantageously, the weeding device 100 allows a user to cut weeds and apply herbicide to weeds while standing. While standing, the user can simply press the herbicide injector 160 into the stalk of the weed or into the ground near the weed and press the first button 112 and the second button 114, and the cutting head 170 may cut the weed and the herbicide injector 160 may inject herbicide into the weed. Also advantageously, the user may cut weeds without significantly damaging the lawn. Accordingly, a user may quickly and easily, without having to kneel, cut weeds and apply herbicide to the weeds.

Accordingly, the present description provides for various embodiments for a weeding device. Many uses and advantages are offered by the weeding device as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. An apparatus comprising:
   a weeding device further comprising:
      a shaft having a length along an elongation direction, a first end, and a second end, wherein the length is arranged to allow a user to use the weeding device while standing;
      a handle having a first button and connected to the first end of the shaft;
      a casing connected to the second end of the shaft;
      a cutting head connected to the casing and rotatable around a first direction, the cutting head further comprising;
         two or more blades that are angularly distributed around a center axis of rotation, wherein each blade has a substantially horizontal cutting edge, wherein the two or more blades are configured to rotate around a centrally placed herbicide injector;
      a guard that encircles the cutting head;
      a motor configured to apply force to rotate the cutting head when activated by the first button;
         the herbicide injector that is connected to the casing, wherein the herbicide injector is located in between the two or more blades, wherein the two or more blades and the herbicide injector extends below the guard, and
         wherein the two or more blades and the herbicide injector are contained within the guard encircling the cutting head and wherein the two or more blades are visible from an underside of the guard, and wherein the herbicide injector is a spike or protrusion that is coated in herbicide.

2. The apparatus of of claim 1, wherein the handle includes a second button, and the first button and the second button are configured to together activate the motor.

3. The apparatus of claim 1, wherein the first direction is parallel to the elongation direction of the shaft.

4. The apparatus of claim 1, wherein the first direction is not parallel to the elongation direction of the shaft.

5. The apparatus of claim 1, wherein the herbicide injector is projected in the first direction away from the casing.

6. The apparatus of claim 1, wherein the herbicide injector is configured to rotate with the cutting head.

7. The apparatus of claim 1, wherein the herbicide injector is configured to not rotate with the cutting head.

8. The apparatus of claim 1, wherein the herbicide injector is movable in the first direction, and the herbicide injector is configured to inject herbicide when the herbicide injector is moved in the first direction.

9. The apparatus of claim 8, further comprising a first spring configured to be deformed when the herbicide injector is moved in the first direction.

10. The apparatus of claim 1, wherein the herbicide injector is hollow and is positioned in between the two or more blades.

11. The apparatus of claim 1, wherein the guard is transparent.

12. The apparatus of claim 1, wherein the length of the shaft is adjustable.

* * * * *